Figure 1:
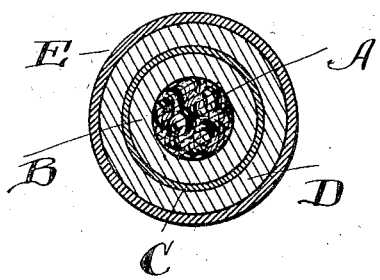

G. C. WORTHINGTON.
GOLF BALL.
APPLICATION FILED FEB. 25, 1907.

972,313.

Patented Oct. 11, 1910.

Witnesses.
E. B. Gilchrist
H. R. Sullivan.

Inventor
George C. Worthington.
By Thurston Woodward
Attorneys

UNITED STATES PATENT OFFICE.

GEORGE C. WORTHINGTON, OF ELYRIA, OHIO.

GOLF-BALL.

972,313.  Specification of Letters Patent.   Patented Oct. 11, 1910.

Application filed February 25, 1907. Serial No. 359,097.

*To all whom it may concern:*

Be it known that I, GEORGE C. WORTHINGTON, a citizen of the United States, residing at Elyria, in the county of Lorain and State of Ohio, have invented a certain new and useful Improvement in Golf-Balls, of which the following is a full, clear, and exact description.

The object of this invention is to provide a rubber cored golf ball, of standard size and weight, which will have great carrying and rolling capacity when driven by a hard blow from a golf club. It is my belief that a rubber cored golf ball in order to have great carrying power under hard blows must have, somewhere within the core, a suitable amount of available unfilled space, into which the rubber of the core may temporarily flow when distorted by a hard blow.
All successful rubber cored golf balls, are so made that this available space is provided, but I believe that the provision of this space is merely an incident to obtaining a ball of required weight and size. The cores of such golf balls are made either of rubber thread or rubber tape wound under considerable tension. When the core is made of rubber thread there will of necessity be much unfilled space, to wit, the space which of necessity will be left between the threads as the core is wound. A ball whose core is made of rubber thread alone will be under weight if it is of the standard size,—this being due to the fact, above stated, that there is, of necessity, in the core much space between the threads which is not filled by the rubber. In order to supply the deficiency in weight of golf balls in which rubber thread is employed to make the core, it is customary to provide a heavy solid center which gives the required weight,—and the thread is wound thereon.

When rubber cores for golf balls are made of rubber tape there is very little unfilled space. In fact that part of the core which is made of such tape is almost solid rubber. Therefore, in order that the balls may be of standard size and weight, such cores are always formed with a soft light yielding center, which is made of wool, hair and other analogous material. Each of these balls contains within itself the necessary space within which the distorted rubber may flow,—this space being in the center of the rubber tape ball, and being distributed throughout the core of the rubber thread ball. This flow space is rather more available in the thread ball,—that is to say, the compressed rubber flows more easily into it, and I believe that it is for this reason that these balls generally fly farther under a hard blow than the rubber tape balls under a blow of like force. It is noticeable, however, that while the rubber thread balls fly farther, the rubber tape balls will, generally speaking, roll farther after they have once struck the ground. This I believe to be due to the fact that the weight in the rubber tape balls is nearer the surface, whereas, in the rubber thread balls it is pretty well concentrated in the center of the ball.

The present invention is one which is designed to take advantage of and to employ the various characteristics above described which produce the great carrying and rolling qualities of the ball. The ball involving the present invention has a soft yielding center, being in that respect like the tape wound balls above mentioned. But the core around this center is made up for most part of rubber thread, wound under tension; and therefore the ball has that characteristic which is specifically due, as above stated, to the use of rubber thread and to the consequent provision of ample and well distributed space into which the compressed rubber may flow. In order to give the necessary weight, however, to the ball without increasing the thickness of the shell, the ball herein described is made up so that there are two thread wound parts thereon, one around the other, and between them is a layer of weighted unvulcanized rubber. My numerous experiments with this ball have satisfied me that the most desirable location for this weighted rubber layer is about midway between the soft center and the outer cover or shell; but the invention is not limited to a ball in which this rubber layer is placed in this precise location.

The invention, in what I believe to be the best embodiment thereof, is shown in the drawing, wherein—

Figure 2:
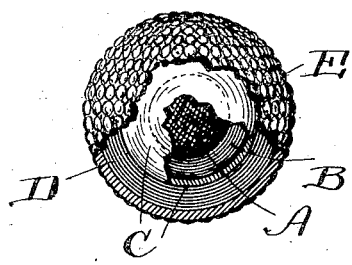

Figure 1 is a central vertical section of a golf ball embodying my invention; and Fig. 2 is a view of such ball partly mutilated and partly sectioned, so as to clearly show the various layers or plies of which it is composed.

The ball, as shown, includes a center A, which may be made of any suitable light soft easily compressible material. I believe that small fragments of rubber, as for example, pieces of rubber thread or rubber bands compressed into suitable form and held by the rubber thread wound thereon is the best material to use for this purpose, but wool, hair or any other analogous material may be substituted. Upon this center, which may be about five-eighths of an inch in diameter, a layer or ply B is formed by suitable windings of rubber thread under tension. The tension employed, however, should not be extreme, as I have found the best results to be obtained if the rubber threads composing this layer be stretched so that this part of the core is rather loose. Upon the spherical body formed by the center A and thread layer B, I secure a layer C of weighted unvulcanized rubber,—that is to say, this layer is made of sheet rubber laid on as evenly as possible and made heavy by the addition thereto of a suitable heavy mineral powder, as, for example and preferably, the red oxid of mercury. This layer adds to the elasticity of the ball somewhat. It supplies the necessary weight to bring the ball to the standard weight when it is also of the standard size, and it also serves to imprison beyond the possibility of escape all of the air in the spaces necessarily existent in the inclosed part of the core, namely, the center A and layer B. The core is completed by winding upon the layer D rubber thread wound under very much greater tension than the thread in layer B.

The cover E may be of the commonly employed material, and may be secured thereon and formed in the usual manner and by the usual means.

Having described my invention, I claim:

1. A golf ball comprising a soft and yielding center, a spherical layer thereon made of rubber thread wound under tension, a layer of weighted unvulcanized rubber embracing said threaded layer, and another layer external to the weighted layer and made up of rubber thread wound under tension, and a shell or cover secured upon the core so formed.

2. A golf ball comprising a soft and yielding center, a spherical layer thereon made up of rubber thread wound under no very great tension, a layer of weighted unvulcanized rubber embracing the threaded layer referred to, another layer, external to the weighted rubber layer, and made up of rubber thread wound under greater tension than the other thread layer, and a shell or cover secured upon the core so formed.

In testimony whereof, I hereunto affix my signature in the presence of two witnesses.

GEORGE C. WORTHINGTON.

Witnesses:
E. L. THURSTON,
E. B. GILCHRIST.